US009560522B2

(12) United States Patent
Smith et al.

(10) Patent No.: US 9,560,522 B2
(45) Date of Patent: Jan. 31, 2017

(54) TAP-TO-WAKE AND TAP-TO-LOGIN NEAR FIELD COMMUNICATION (NFC) DEVICE

(71) Applicant: Intel Corporation, Santa Clara, CA (US)

(72) Inventors: Ned Smith, Beaverton, OR (US); Victoria C Moore, Phoenix, AZ (US); Avi Kanon, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 13/721,814

(22) Filed: Dec. 20, 2012

(65) Prior Publication Data

US 2014/0181535 A1 Jun. 26, 2014

(51) Int. Cl.

| | |
|---|---|
| *G06F 1/32* | (2006.01) |
| *H04W 12/06* | (2009.01) |
| *G06F 1/16* | (2006.01) |
| *H04B 5/00* | (2006.01) |
| *H04W 52/02* | (2009.01) |
| *G06F 21/35* | (2013.01) |
| *G06F 21/74* | (2013.01) |

(Continued)

(52) U.S. Cl.
CPC .............. *H04W 12/06* (2013.01); *G06F 1/16* (2013.01); *G06F 1/3231* (2013.01); *G06F 1/3287* (2013.01); *G06F 21/35* (2013.01); *G06F 21/74* (2013.01); *G06F 21/81* (2013.01); *H04B 5/0056* (2013.01); *H04W 52/0225* (2013.01); *G06F 2200/1636* (2013.01); *G06F 2221/2105* (2013.01); *G06F 2221/2111* (2013.01); *H04L 63/0853* (2013.01); *Y02B 60/1282* (2013.01); *Y02B 60/1289* (2013.01)

(58) Field of Classification Search
CPC ................ G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | | |
|---|---|---|---|---|
| 8,494,576 B1 * | 7/2013 | Bye | .................... | G07C 9/00087 455/403 |
| 2005/0025084 A1 * | 2/2005 | Heuts | .................... | G06F 1/3203 370/315 |

(Continued)

FOREIGN PATENT DOCUMENTS

WO 2009/066324 A2 5/2009

OTHER PUBLICATIONS

International Search Report and Written Opinion received for PCT Application No. PCT/US2013/047798, mailed on Sep. 27, 2013, 10 pages.

(Continued)

*Primary Examiner* — Thomas Lee
*Assistant Examiner* — Mohammad A Rahman
(74) *Attorney, Agent, or Firm* — Forefront IP Lawgroup of Christie and Rivera, PLLC

(57) ABSTRACT

Described herein are techniques related to a tap-to-wake and tap-to-login system. This Abstract is submitted with the understanding that it will not be used to interpret or limit the scope and meaning of the claims. A tap-to-wake and tap-to-login system allows a user of a near field device to wake up a computing platform from a deep sleep state using a bump/tap without having to move a mouse or enter a keyboard stroke.

28 Claims, 5 Drawing Sheets

(51) Int. Cl.
*G06F 21/81* (2013.01)
*H04L 29/06* (2006.01)

(56) References Cited

U.S. PATENT DOCUMENTS

| | | | |
|---|---|---|---|
| 2009/0063878 A1* | 3/2009 | Schmidt | G06F 1/3209 |
| | | | 713/310 |
| 2009/0077400 A1* | 3/2009 | Enami et al. | 713/320 |
| 2009/0325566 A1 | 12/2009 | Bell et al. | |
| 2010/0235619 A1 | 9/2010 | Inoue | |
| 2010/0251342 A1* | 9/2010 | Uchikawa | 726/4 |
| 2011/0102137 A1* | 5/2011 | Schroter | 340/5.52 |
| 2011/0126009 A1 | 5/2011 | Camp, Jr. et al. | |
| 2011/0258456 A1 | 10/2011 | Lyakhovitskiy | |
| 2012/0025948 A1* | 2/2012 | Lakamraju | E05B 47/00 |
| | | | 340/5.6 |
| 2013/0007873 A1* | 1/2013 | Prakash | G06F 21/31 |
| | | | 726/18 |
| 2013/0258424 A1* | 10/2013 | Ono et al. | 358/475 |
| 2013/0340073 A1* | 12/2013 | Bhaskaran et al. | 726/19 |
| 2014/0225713 A1* | 8/2014 | McIntyre | G07C 9/00309 |
| | | | 340/5.61 |
| 2015/0019892 A1* | 1/2015 | Agrawal | H04B 5/0031 |
| | | | 713/323 |

OTHER PUBLICATIONS

International Preliminary Report on Patentability and Written Opinion Received for PCT Patent Application No. PCT/US2013/047798, mailed on Jul. 2, 2015, 7 pages.

Extended European Search Report received for European Patent Application No. 13863854.9, mailed on Jun. 20, 2016, 6 pages.

\* cited by examiner

TAP-TO-WAKE AND TAP-TO-LOGIN NEAR FIELD COMMUNICATION (NFC) DEVICE

BACKGROUND

A computing device platform typically uses power management to reduce power usage when a user has stepped away from or has stopped using the platform for a period of time. The platform can enter into several power states which range from the computing device platform being fully operational (active state) to the computing device platform being asleep (sleep state, power-saving state, etc.). When the computing device platform is not fully operational the platform is termed "power-gated."

To return the computing device platform to a state that is not power-gated the user traditionally has to perform manual operations such as pressing the computing device platform power button/switch, or implementing a "<ctrl> <alt> <del>" keystroke on the keyboard, or moving the mouse. Additionally, to complete wake up of the computing device platform the user oftentimes has to enter a password using the keyboard.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

The technology described herein includes a wireless communication device that wakes up a computing device platform from one or more sleep states when the wireless communication device comes into proximity with the computing device. In one or more implementations, the computing device platform includes several power states. Power states include an active state one or more sleep states. The Advanced Configuration and Power Interface (ACPI) specification may define power states that the computing device platform implements. The computing device platform also includes a wireless communication module that has a radio. The radio includes a wireless communication device-detect mode.

In the device-detect mode of the radio, the computing device platform is able to detect the presence of the wireless communication device when a user "taps" or "bumps" the wireless communication device to the computing device platform at a distance that brings the wireless communication device within the reception range of the computing device platform. The tap includes an authentication request. In response to the tap, the computing device platform wakes up sufficiently to respond to the wireless communication device's request to be authenticated. That is, the "tap" or "bump" is itself sufficient to wake up the computing device platform from a sleep state without having to manipulate the keyboard or mouse. The computing device platform is then able to issue a challenge response to the wireless communication device in an attempt to authenticate the wireless communication device so the user can utilize the computing device platform.

Example Tap-to-Wake and Tap-to-Login Environment

Figure 1:
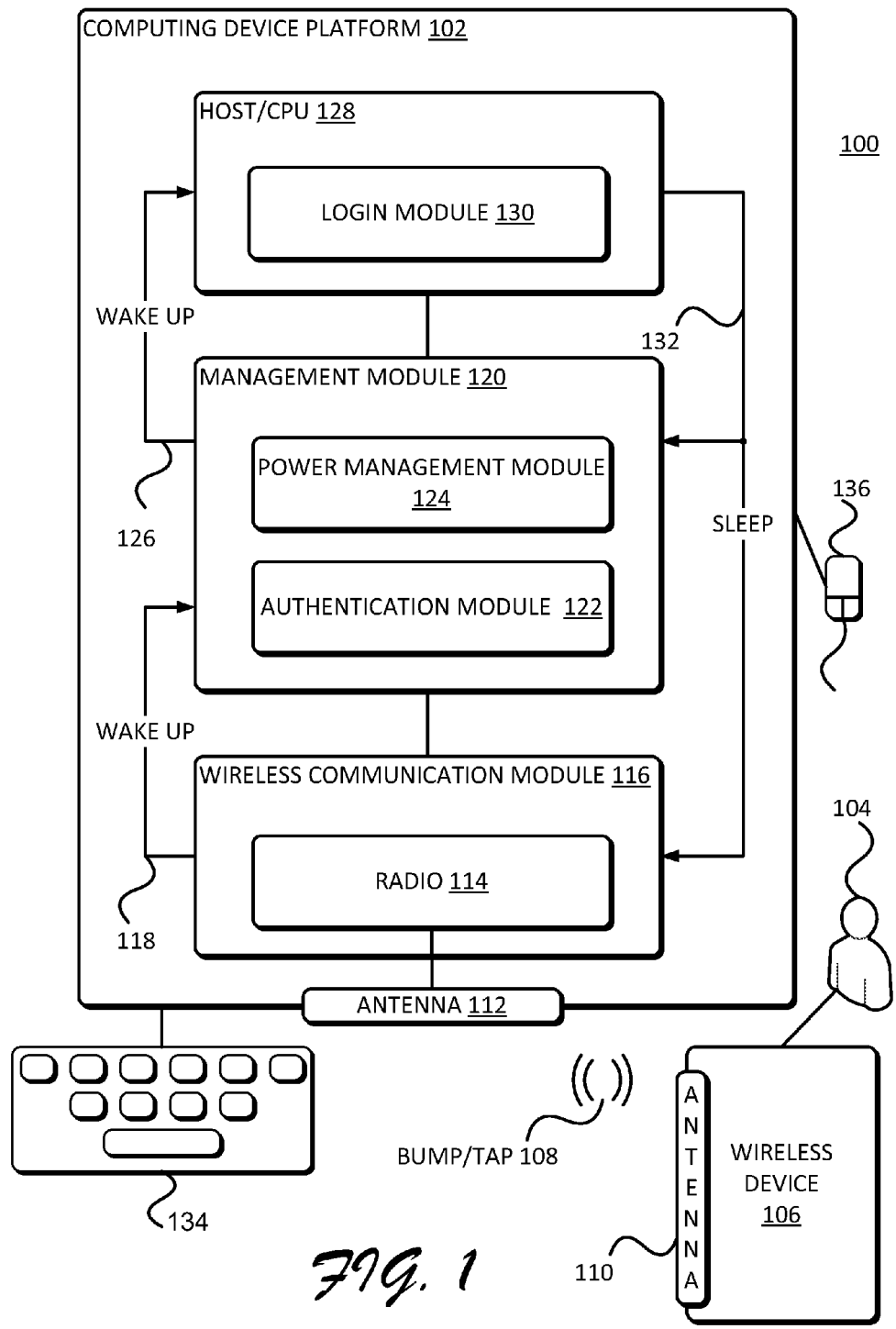
FIG. 1 illustrates a block diagram of a tap-to-wake and tap-to-login system according to one or more implementations described herein.

FIG. 1 illustrates an example tap-to-wake environment 100 according to one or more implementations described herein. In the illustrated implementation, the environment 100 includes a computing device platform 102 on which a user 104 of a wireless communication device 106 performs a "bump/tap" 108. The bump/tap 108 sends a wireless authentication request signal from the antenna 110 of the wireless communication device 106 to the antenna 112 of the computing device platform 102.

In the illustrated implementation, a radio 114 receives the authentication request signal from the antenna 112 and sends it to a wireless communication module 116. The wireless communication module 116 sends a wake up signal 118 to a management module 120.

The management module 120 includes an authentication module 122. The authentication module 122 attempts to authenticate the wireless communication device 106 by sending a wireless authentication challenge signal to the wireless communication device 106 in response to the wireless authentication request signal sent by the wireless communication device 106.

The management module 120 also includes a power management module 124. The power management module 124 changes power states of the computing device platform 102 platform in response to the wireless communication device 106 being authenticated. The power states can be changed to a higher-power state.

After successful authentication of the wireless communication device 106, the management module 120 sends a wake up signal 126 to a host/central processing unit (host/CPU) 128. The host/CPU 128 includes a login module 130.

In one implementation, the user 104's login credentials, such as a password or a certificate, are maintained by the authentication module 122. In this scenario, in response to the wake up signal 126, the login module 130 queries the wireless authentication module 122 for user 104's login credentials. When the login module 130 queries the authentication module 122, the authentication module 122 returns the user 104's login credentials to the login module 130.

In an alternative implementation, the user 104's login credentials, such as a password or a certificate, are maintained by the wireless communication device 106. In this scenario, in response to the wake up signal 126, the login module 130 queries the wireless communication device 106 for user 104's login credentials. When the login module 130 queries the wireless communication device 106, the wireless communication device returns the user 104's login credentials to the login module 130.

When the login module 130 determines that the wireless communication device 106 has been authenticated and that login is successful, the login module 130 launches the user 104's environment on a display in the computing device platform 102.

In the illustrated implementation, the host/CPU 128 issues a sleep signal 132 to the wireless communication module 116 and the management module 120. The host/CPU issues the sleep signal 132 in one or more scenarios. In one or more implementations, the scenarios also include a second bump/tap 108 by the wireless communication device 106, the wireless communication device 106 no longer being within the reception range of the computing device platform 102, the signal strength from the wireless communication device 106 being reduced from a predetermined value, a predetermined time has elapsed since the wireless communication device 106 has not been within the reception range of the computing device platform 102, and the like.

In the illustrated implementation, the computing device platform 102 includes a keyboard 134 and a mouse 136. Typically, the wake up signal 118 can be triggered if the user 104 makes an entry on the keyboard 134 or if the user 104 moves the mouse 136. According to one or implementations, making an entry on the keyboard 134 or moving the mouse 136 is not necessary to trigger the wake up signal 118. For example, the user can perform the bump/tap 108 and all or a portion of the computing device platform 102 wakes up from a low-power state.

Tap-to-Wake and Tap-to-Login Environment Component Descriptions

The illustrated computing device platform 102 is any suitable computing device, such as a desktop computer, a laptop computer, a notebook computer, a tablet computer, a smart phone, and the like, that recognizes tap or bump gestures. The computing device platform 102 includes a chip set and central processing unit (CPU) architecture, which are integrated into a motherboard (not shown) of the computing device platform 102. The computing device platform 102 also may include other hardware components outside the core chip set of a platform. Examples of devices are liquid crystal display (LCD) panels, video adapters, Integrated Drive Electronics (IDE), CD-ROM controllers, hard disk controllers, communication (COM) ports, and so on.

In one or more implementations, the computing device platform 102 communicates with the wireless communication device 106 using known or future short distance wireless technologies. The particular communication techniques are determined by the technology implemented in the environment 100. Such technologies include NFC technology, Bluetooth™ technology, infrared technology, accelerometer technology, palm vein sensor technology, ambient light technology, ultrasound technology, WiFi™, RFID, and the like.

The illustrated wireless communication device 106 is any suitable device that is capable of establishing a wireless communication channel with the antenna 112 of the computing device platform 102. For example, the wireless communication device 106 may be a smart card and/or a proximity card that includes embedded integrated circuits that are capable of communicating with the computing device platform 102 without making physical contact with the computing device platform 102.

Alternatively, the wireless computing device 106 is a smart phone emulating a smart card and/or a proximity card, a computing device emulating a smart card and/or a proximity card, etc. The wireless communication device 106 includes user identification information that is provided to the computing device platform 102 when requested.

In one or more implementations, the wireless communication device 106 communicates with the computing device platform 102 using known or future short distance wireless technologies. The particular communication techniques are determined by the technology implemented in the environment 100. Such technologies include NFC technology, Bluetooth™ technology, infrared technology, accelerometer technology, palm vein sensor technology, ambient light technology, ultrasound technology, WiFi™, RFID, and the like.

The illustrated bump/tap 108 occurs when the antenna 110 of the wireless device 106 is placed in close proximity with the antenna 112 of the computing device platform 102 such that electromagnetic or radio frequency signals are coupled between the wireless device 106 and the computing device platform 102. The coupling distance of the electromagnetic or radio frequency signals varies depending upon the short distance wireless communication technology employed.

For example, the coupling distance between the antenna 110 and the antenna 112 is determined by the technology implemented in the environment 100. Such technologies include NFC technology, Bluetooth™ technology, infrared technology, accelerometer technology, palm vein sensor technology, ambient light technology, ultrasound technology, WiFi™, RFID, and the like.

The illustrated antenna 110 is any suitable antenna that is capable of transmitting and receiving electromagnetic and/or radio frequency (RF) signals. In one or more implementations, the antenna 110 is integrated into a bezel of the wireless device 106 using known techniques.

The illustrated antenna 112 is any suitable antenna that is capable of transmitting and receiving electromagnetic and/or radio frequency (RF) signals. In one or more implementations, the antenna 112 is integrated into a bezel of the computing device platform 102 platform. The antenna 112 also is connected to the radio 114, typically but not necessarily via hardwire.

The illustrated radio 114 transmits, receives, and/or processes electromagnetic and/or RF signals. The particular frequencies, processing techniques, etc., that the radio 114 utilizes are determined by the technology implemented in the environment 100. Such technologies include NFC technology, Bluetooth™ technology, infrared technology, accelerometer technology, palm vein sensor technology, ambient light technology, ultrasound technology, WiFi™, RFID, and the like. In one or more implementations, the radio 114 is implemented in firmware in the computing device platform 102.

Although illustrated as being integrated within the wireless communication module 116, the radio 114 is not so limited. For example, the radio 114 may be a stand-alone module within the computing device platform 102.

Figure 2:
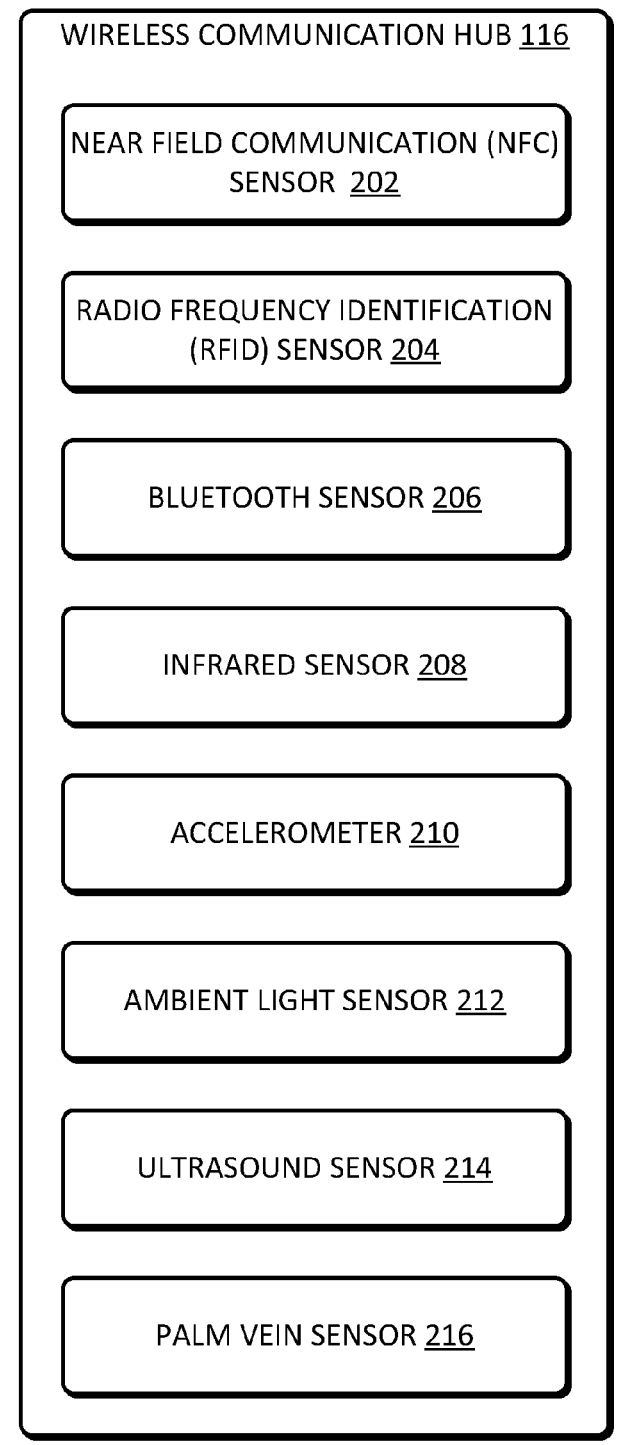
FIG. 2 illustrates an example of the wireless communication module depicted in FIG. 1 according to one or more alternative implementations described herein.

In one or more implementations, the wireless communication module 116 includes a variety of sensors. FIG. 2 illustrates an example of the wireless communication module 116 according to one or more alternative implementations described herein. The illustrated wireless communication module 116 includes a near field communication (NFC) sensor 202, a radio frequency identification (RFID) sensor 204, a Bluetooth™ sensor 206, an infrared proximity sensor 208, an accelerometer 210, an ambient light sensor 212, an ultrasound sensor 214, and a palm vein sensor 216. The infrared proximity sensor 208, accelerometer 210, ambient light sensor 212, ultrasound sensor 214, and palm vein sensor 216. Although not necessarily implementing RF communications technology the wireless device 106 may also be equipped to communicate using infrared signals, an accelerometer, ambient light, ultrasound signals, and palm vein biometric technology. Moreover, although not illustrated, the wireless communication module 116 also may include a WiFi™ sensor. Implementation of these sensors is known and as such will not be discussed further.

Returning to FIG. 1, the illustrated wake up signal 118 is implemented using a General Purpose Input/Output (GPIO) trigger that is available on the wireless communication module 116. In one or more implementations, the wireless communication module 116 determines that the management module 120 should be awakened. The wireless communication module 116 then pulls the voltage of a designated GPIO pin on the wireless communication module 116 to logic HIGH. The now logic HIGH GPIO pin causes a power well for the management module 120 to supply current to the management module 120. The management module 120 then performs an initialization sequence and polls the wireless communication module 116 to determine whether there are one or more pending data transfers.

The illustrated management module 120 is a secure, trusted environment and/or a security processor. In one or more implementations, coupling of the electromagnetic or radio frequency signals provides a trusted path between the wireless communication device 106 and the management module 120.

In one or more implementations, the wireless communication module 116 and the management module 120 form part of a chipset.

The illustrated authentication module 122 receives the user identification information from the wireless communication device 106 and determines whether the user 104 is authorized to access the computing device platform 102. In one or more implementations, the authentication module compares the user identification information obtained from the wireless communication device 106 to user identification information located in the authentication module 122. If they match, the authentication module 122 authenticates the wireless communication device 106. If they do not match, the authentication module 122 does not authenticate the wireless communication device 106.

The illustrated power management module 124, along with the operating system (OS), uses power-gating to causes the power states of the computing device platform 102 platform to change in response to an indication from the authentication module 122 that the wireless communication device 106 had been authenticated. Power-gating is a technique used in computing device platforms to reduce power dissipation in the computing device platform.

For instance, the computing device platform 102 is typically divided in to blocks. Power-gating is used to remove power from idle portions of blocks in the computing device platform 102. Removing power from idle portions of blocks in the computing device platform 102 reduces the power consumption of the computing device platform 102.

Figure 3:
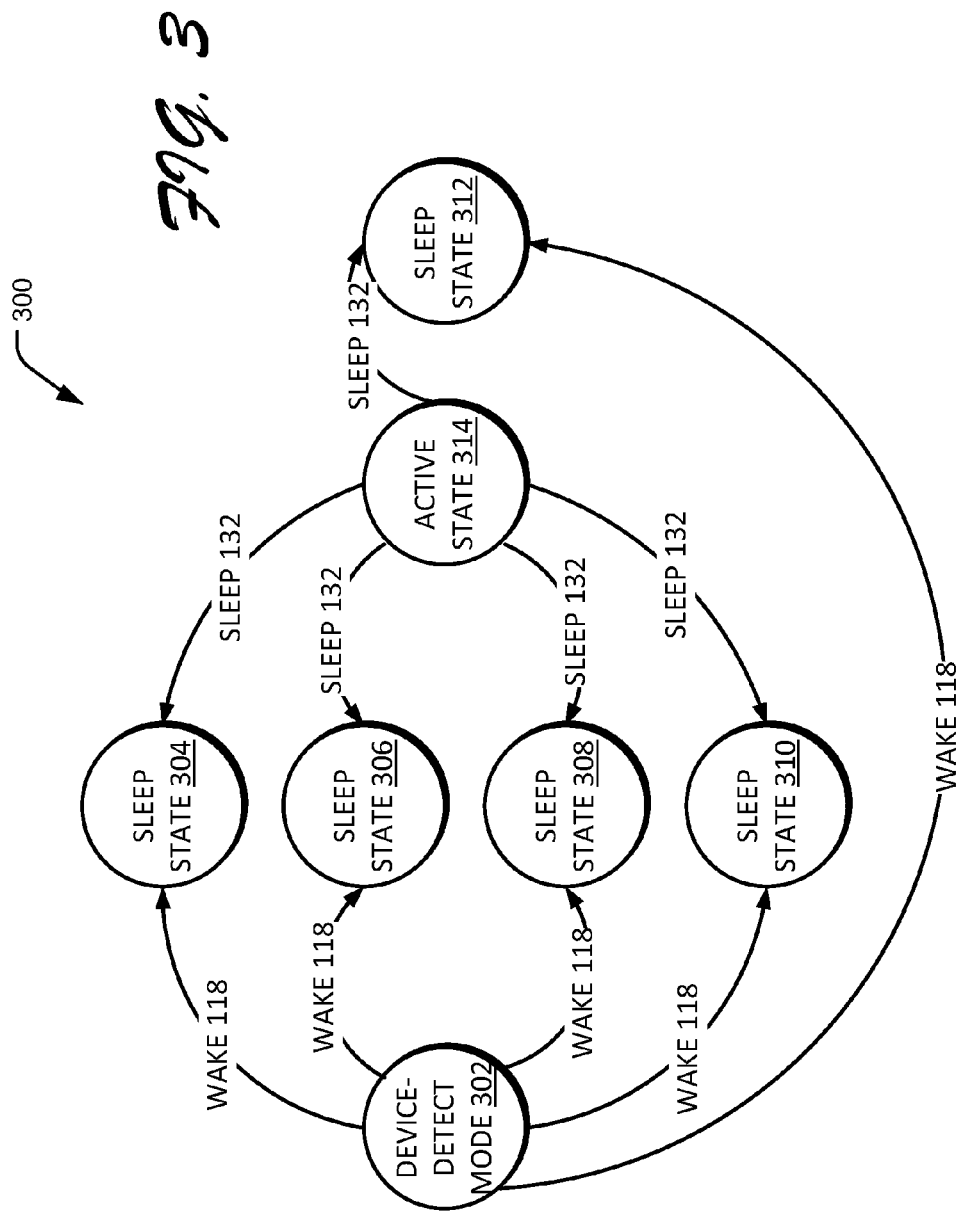
FIG. 3 illustrates examples of power states of the computing device platform depicted in FIG. 1 according to one or more implementations described herein.

FIG. 3 illustrates examples of power states 300 of the computing device platform 102 platform and their relationship to each other according to one or more implementations described herein. In the illustrated implementation, the computing device platform 102 includes a device-detect mode 302, a sleep state 304, a sleep state 306, a sleep state 308, a sleep state 310, a sleep state 312, and an active state 314.

In the device-detect mode 302, the wireless communication module 116 issues the wake signal 118 to the management module 122. The wake up signal 118 causes the computing device platform 102 to wake up from one of the sleep states 304, 306, 308, 310, and/or 312.

In the active state 314, the host/CPU 128 issues the sleep signal 132 to the management module 122 and the wireless communication module 116 to place the computing device platform 102 in one of the sleep states 304, 306, 308, 310, and 312.

In one or more implementations, the ACPI Specification defines the sleep states 304, 306, 308, 310, and 312. For example, the sleep state 304 may be equivalent to or similar to sleep state S1 in the ACPI Specification. The sleep state 306 may be equivalent to or similar to sleep state S2 in the ACPI Specification. The sleep state 308 may be equivalent to or similar to sleep state S3 in the ACPI Specification. The sleep state 310 may be equivalent to or similar to sleep state S4 in the ACPI Specification. The sleep state 312 may be equivalent to or similar to sleep state S5 in the ACPI Specification. The active state 314 may be equivalent to or similar to working state G0/S0 in the ACPI Specification.

In alternative implementations, power saving techniques such as S0iX power states, implemented by an S0iX handler in the computing device platform 102, and Connected Standby, for example may be used.

In one or more implementations, the device-detect mode 302 is a low-power mode of the computing device platform 102 in which the computing device platform 102 is capable of detecting an authentication request included in the bump/tap 108 from the wireless communication device 106. The computing device platform 102 can then wake up at least far enough so that the authentication module 122 can send an authentication challenge response to the wireless communication device 106.

Based on a successful authentication challenge response, the power management module 124 then can cause the computing device platform 102 to change power states from the device-detect mode 302 to one of the sleep states 304, 306, 308, 310, or 312. In this scenario, the wireless communication module 116 issues the wake up signal 118 to the management module 120.

Alternatively, if the authentication challenge response is successful, the power management module 124 then can cause the computing device platform 102 to change power states from the device-detect mode 302 to the active state 314. In this scenario, the wireless communication module 116 issues the wake up signal 118 to the management module 120, which then issues the wake up signal 126 to the host/CPU 128.

If the authentication challenge response is unsuccessful, the computing device platform 102 may not change power states. Alternatively, if the computing device platform 102 has changed power states in order to evaluate the authentication status of the wireless device 106 and the authentication is unsuccessful, then the computing device platform 102 returns to the previous power state that it was in prior to the bump/tap 108.

Alternatively, if the authentication challenge response is unsuccessful the power management module 124 still can cause the computing device platform 102 to change power states from the device-detect mode 302 to one of the sleep states 304, 306, 308, 310, or 312. In this scenario, the power management module 124 causes the computing device platform 102 to enter one of the sleep states 304, 306, 308, 310, or 312 that is capable of providing feedback to the user 104 that the authentication was not successful. This can be accomplished by powering up a graphics engine in the computing device platform 102 sufficiently to display a message on a screen or play a sound through a speaker that indicates that authentication was not successful. A secure audio video path from the management module 122 and the graphics engine may be utilized to communicate to the user that authentication was unsuccessful.

Alternatively still, if the authentication challenge response is unsuccessful the power management module 124 can cause the computing device platform 102 to change power states from the device-detect mode to the active state 314. In this scenario, the power management module 124 causes the computing device platform 102 to enter active state 314 so that the host/CPU 128 is powered up for a sufficient amount of time that to provide feedback to the user 104 that the authentication was not successful. This also can be accomplished by having the host/CPU 128 power up the graphics engine and/or a speaker driver to notify the user 104 that authentication was not successful. The secure audio video path from the management module 122 and the graphics engine and/or speaker driver can be utilized in this scenario as well.

In one or more implementations, while in the device-detect mode 302 the computing device platform 102 consumes less power than in the sleep states 306, 308, 310, and 312, and the active state 314.

In one or more implementations, sleep state 304 is a low wake latency sleeping state. In sleep state 304, no computing device platform 102 context is lost (host/CPU 128 or chipset (i.e., wireless communication module 116 and the management module 120)) and hardware maintains all system context.

In one or more implementations, the sleep state 306 also is a low wake latency sleeping state. Sleep state 306 is similar to sleep state 304 except that the host/CPU 128 and the computing device platform cache context is lost (the operating system (OS) is responsible for maintaining the caches and host/CPU 128 context). In the sleep state 306, the host/CPU 128 is powered off.

In one or more implementations, the sleep state 308 is a low wake latency sleeping state where all system context is lost except system memory. The host/CPU 128, cache, and chipset context are lost in the sleep state 308. Hardware maintains memory context and restores some host/CPU 128 and second-level cache (L2) configuration context. Sleep state 308 also may be referred to as "Standby" mode, "Sleep" mode, and/or "Suspend to RAM" mode.

In one or more implementations, the sleep state 310 is the lowest power, longest wake latency sleeping state supported by the ACPI. In order to reduce power to a minimum, it is assumed that the computing device platform 102 has powered off all devices. Computing device platform 102 context is maintained. Sleep state 310 may be referred to as "Hibernation" mode and/or "Suspend to Disk" mode.

In one or more implementations, the sleep state 312 is similar to the sleep state 310 except that the OS does not save any context. The system is in the "soft off" state and requires a complete boot when it wakes. In the sleep state 312 power to the computing device platform 102 is removed from all but the power button/switch, which remains powered so that the user 104 can use it to reboot the computing device platform 102.

In one or more implementations, when the computing device platform 102 is in any of the sleep states 304, 306, 308, 310, and 312 the device-detect mode 302 provides, upon authentication, the wake up signal 118 to the management module 120 so that all or a portion of the computing device platform 102 can wake up. This is also true in the sleep state 312 in which some type of keyboard entry and/or mouse movement typically is needed to wake up the computing device platform 102. That is, the computing device platform 102 can wake up from the sleep state 312 just by having the user 104 perform the bump/tap 108 of the computing device platform 102 even though no keyboard 134 entry and/or mouse 136 movement is made.

In one or more implementations, the active state 314 is similar to the sleep state 310 except that the OS does not save any context work is being performed by the OS/application software and the hardware.

Of course, the sleep states and active state illustrated in FIG. 3 are example power states. The computing platform 102 may have more, fewer, or different power states.

Returning back to FIG. 1, the illustrated wake up signal 126 is implemented using a General Purpose Input/Output (GPIO) trigger that is available on the management module 120. In one or more implementations, the management module 122 determines that the host/CPU 128 should be awakened. The management module 122 then pulls the voltage of a designated GPIO pin on the host/CPU 128 to logic HIGH. The now logic HIGH GPIO pin causes a power well for the host/CPU 128 to supply current to the host/CPU 128. The host/CPU 128 then performs an initialization sequence.

In one or more implementations, the illustrated host/CPU 128 is the part of the computing device platform 102 that executes the instructions that do the work of the computing device platform 102.

In one or more implementations, illustrated login module 130 may verify that the wireless communication device 106 is authorized to use the computing device platform 102. The login credentials that the login module 130 uses may be the same as the authentication credentials used by the authentication module 122.

Alternatively, the login credentials used by the login module 130 may be different from the authentication credentials used by the authentication module 122. In one or more implementations, the login credentials can be user 104's password or login certificate.

In any case, the login credentials for the user 104 and wireless communication device 106 remain protected in the secure, trusted environment of the management module 120. For example, even though the login module 130 interfaces with the management module 120, the login credentials are protected in the secure environment of the management module 120. The management module 120 includes a template of the login credentials. As such, the management module 120 rather than the host/CPU 128 compares the credentials obtained from the wireless communication device 106 to the template. The management module 120 then notifies the host/CPU 128 that the wireless communication device 106 has been authenticated. In this way, the integrity and secrecy of the login credentials are protected.

In one or more implementations, the sleep signal 132 is issued by the host/CPU 128. For example, when the host/CPU 128 decides to enter into a power-gated state the host/CPU 128 broadcasts the sleep signal 132 to the wireless communication module 118 and the management module 120. The host/CPU 128 operating system (OS), BIOS, or other power management software invokes power controller interfaces (e.g., ACPI), specifying which power state(s) the host/CPU 128 should enter.

In one or more implementation, the wireless communication device 106 is not authenticated after the authentication module 122 issues the authentication challenge response to the wireless communication device 106. In this scenario, the management module 120 may itself issue a sleep signal without waking the host/CPU 128. Issuance of the sleep signal depends on whether the power management module 124 has access to other non-management module 120 devices' power management interfaces. If the power management module 124 does not have access to other non-management module 120 devices' power management interfaces, then the host/CPU 128 briefly is awakened, e.g., long enough to cause the computing device platform 102 to power down into a sleep state. If the power management module 124 has access to other non-management module 120 devices' power management interfaces, then the power management module 124 generates sleep signals before switching itself into a power-gated state.

In one or more implementations, the keyboard 134 is a standard QWERTY keyboard. For example, the keyboard 106 includes keys such as <ctrl>, <alt>, and <del>. Traditionally, the user 104 enters the keyboard shortcut <ctrl> <alt> <del> on the keyboard 134 to wake up the computing device platform 102. However, if the computing device platform 102 is in deep sleep states such as 310 and/or 312 the keyboard shortcut may not wake up the computing device platform 102. In one or more implementations, the computing device platform 102 is in the device-detect mode 302 and the user 104 can perform the bump/tap 108 with the wireless communication device 106 to cause the computing device platform 102 to wake up sufficient to attempt to authenticate the wireless computing device 106.

In one or more implementations, the mouse 136 represents any suitable user input device, such as a track ball, pointing device, etc. Traditionally, the user 104 can move the mouse 136 to wake up the computing device platform 102. However, if the computing device platform 102 is in deep sleep states such as 310 and/or 312 the mouse movement may not wake up the computing device platform 102. In one or more implementations, the computing device platform 102 is in the device-detect mode 302 and the user 104 can perform the bump/tap 108 with the wireless communication device 106 to cause the computing device platform 102 to wake up sufficient to attempt to authenticate the wireless computing device 106.

Example Tap-to-Wake/Tap-to-Login Operation

Figure 4:
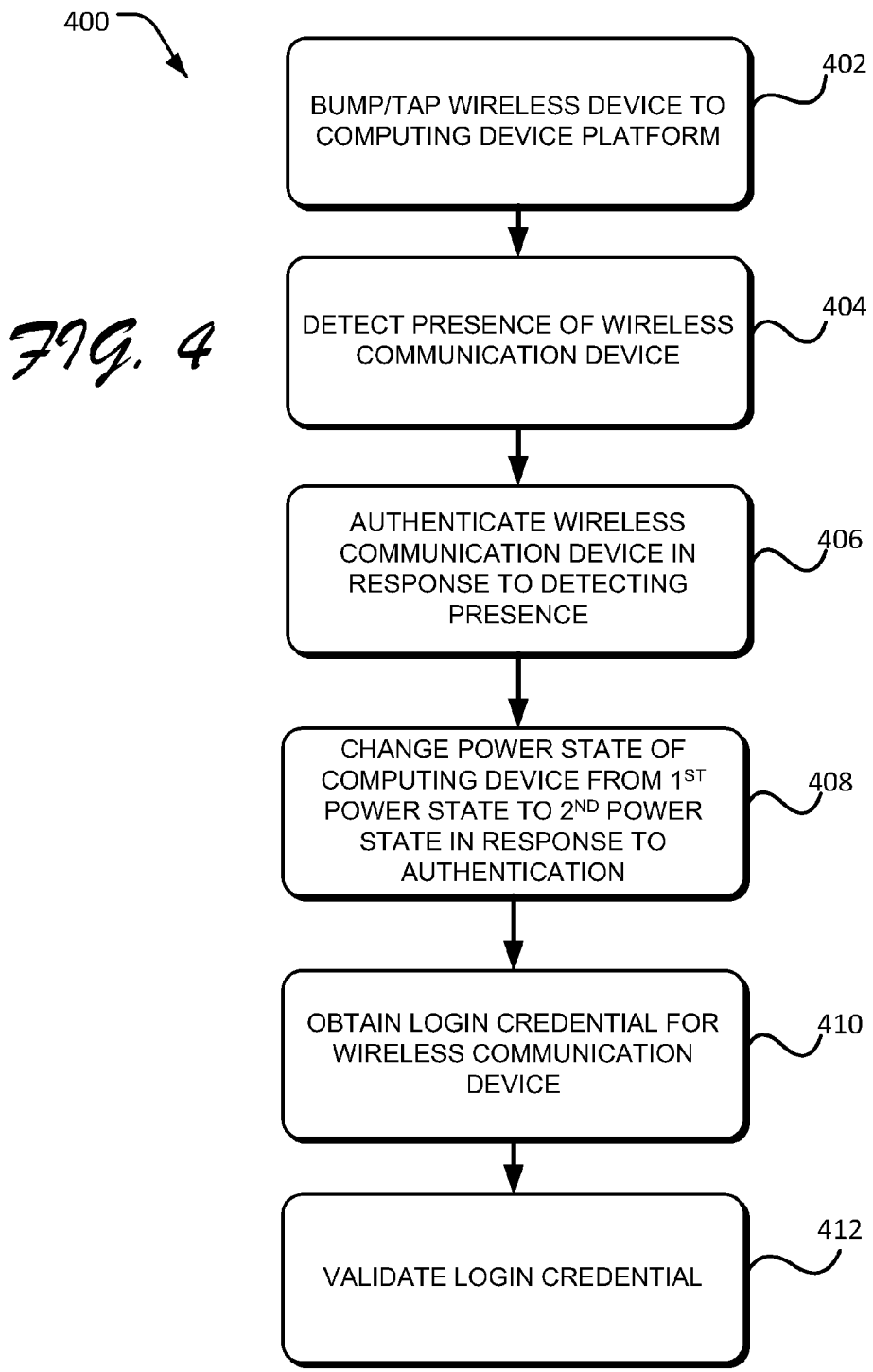
FIG. 4 is a flowchart illustrating an example of how the tap-to-wake and tap-to-login authentication system illustrated in FIG. 1 operates according to one or more implementations described herein.

FIG. 4 is a flowchart of a method 400 illustrating operation of the tap-to-wake environment 100 according to one or more implementations described herein. The operation of the method 400 assumes that the computing device platform 102 is in a power-gated state, such as the sleep state 312. Also, the method 400 assumes that the computing device platform 102 is in the device-detect mode 302.

In a block 402, the method 400 bumps/taps a wireless communication device to a computing device platform. In one or more implementations, the user 104 performs the bump/tap 106 of the wireless communication device 106 near the antenna 112 of the computing device platform 102.

In a block 404, the method 400 detects the presence of the wireless communication device. In one or more implementations, in response to the user 104 performing the bump/tap 106 of the wireless communication device 106 near the antenna 112 of the computing device platform 102 the radio 114 detects the presence of the wireless communication device 106.

In response to detecting the presence of the wireless communication device 106, the radio 114 issues the wake up signal 118 to the management module 120. In one or more implementations, the radio 114 raises a GPIO pin on the management module 112. Raising the GPIO pin on the management module 112 triggers the management module 112 to enter into one of the sleep states 304, 306, 308, or 310 from the power-gated sleep state 312.

In a block 406, the method 400 authenticates the wireless communication device. In one or more implementations, management module 120 loads and runs an authentication application in an attempt to authenticate the wireless communication device 106.

The management module 120 then determines whether the host/CPU 128 is needed to authenticate the wireless communication device 106. If the host/CPU 128 is needed to authenticate the wireless communication device 106, the management module 120 issues the wake up signal 126 to the host/CPU 128 to wake up the host/CPU 128 sufficiently to allow the host/CPU 128 to assist in the authentication process. For example, the management module 120 raises a GPIO pin on the host/CPU 128. Raising the GPIO pin on the host/CPU 128 causes the host/CPU 128 operating system (OS), Basic Input/Output System (BIOS), and/or Pre-Boot Authorization (PBA) to run. The host/CPU 128 then queries the management module 120 for the authentication status of the wireless communication device 106. The authentication module 122 in the management module 120 then issues an authentication challenge to the wireless communication device 106 via the radio 114.

If the host/CPU 128 is not needed to authenticate the wireless communication device 106, the management module 120 does not issue the wake up signal 126 to the host/CPU 128. Instead, the authentication module 122 in the management module 120 issues the authentication challenge to the wireless communication device 106 via the radio 114 without going through the host/CPU 128.

In one or more implementations, the wireless communication device 106 responds to the authentication challenge issued by the management module 120. The authentication module 122 then verifies the authentication challenge and authorizes the user of the wireless communication device 106 to access the computing device platform 102.

In a block 408, in response to authentication the method 400 changes the power state of the computing device platform. In one or more implementations, the method 400 determines whether the host/CPU 128 is in a power-gated state. If the host/CPU 128 is in a power-gated state, the management module 120 issues the wake up signal 126 to the host/CPU 128 to wake up the host/CPU 128 sufficiently to permit the host/CPU 128 to assist in the login process for the user 104. If the host/CPU 128 is not in a power-gated state, the method 400 performs a login of the user 104 without waking the host/CPU 128.

In a block 410, the method 400 obtains login credential(s) for the wireless communication device. In one or more implementations, the user 104's login credentials, such as a password or a certificate, are maintained by the authentication module 122. The login module 130 queries the authentication module 122 for user 104's login credentials. When the login module 130 queries the authentication module 122, the authentication module 122 returns the user 104's login credentials to the login module 130.

In an alternative implementation, the user 104's login credentials are maintained by the wireless communication device 106. In response to the wake up signal 126, the login module 130 queries the wireless communication device 106 for user 104's login credentials. When the login module 130 queries the wireless communication device 106, the wireless communication device returns the user 104's login credentials to the login module 130.

In a block 412, the method 400 validates the login credential. In one or more implementations, the login credentials are protected in the secure environment of the management module 120. This ensures that the integrity and secrecy of the login credentials are protected.

The management module 120 includes a template of the login credentials. The management module 120 compares the credentials obtained from the wireless communication device 106 to the template. The management module 120 then notifies the host/CPU 128 that the user 104's login credentials have been validated.

Once the validation of login credentials is successful, the computing device platform 102 changes power state from a power-gated sleep state to the active state 314. The computing device platform 102 then can proceed with normal operations.

During normal operations, the computing device platform 102 checks to determine whether the user 104 is still present at the computing device platform 102. If the user 104 is still present at the computing device platform 102, as indicated by the user 104 entering keyboard strokes or moving the mouse, for example, the computing device platform 102 continues with normal operations.

If, on the other hand, the user 104 is no longer present at the computing device platform 102, as indicated by the wireless communication module 104 performing a second authentication test, which is unsuccessful, a certain amount of time having elapsed since the user 104 has entered a keyboard stroke, moved the mouse, etc., the host/CPU 128 transitions the computing device platform back to a power-gated state. The radio 114 also transitions to the device-detect mode 302.

The method 400 is illustrated as a collection of actions in a logical flow graph, which represent a sequence of operations that can be implemented in mechanics alone or a combination with hardware, software, and/or firmware. In the context of software/firmware, the actions represent instructions stored on one or more computer-readable storage media that, when executed by one or more processors, perform the recited operations. Note that the order in which the processes are described is not intended to be construed as a limitation, and any number of the described process blocks can be combined in any order to implement the processes or an alternate process. Additionally, individual actions may be deleted from the processes without departing from the spirit and scope of the subject matter described herein.

Example Computing Environment

Figure 5:
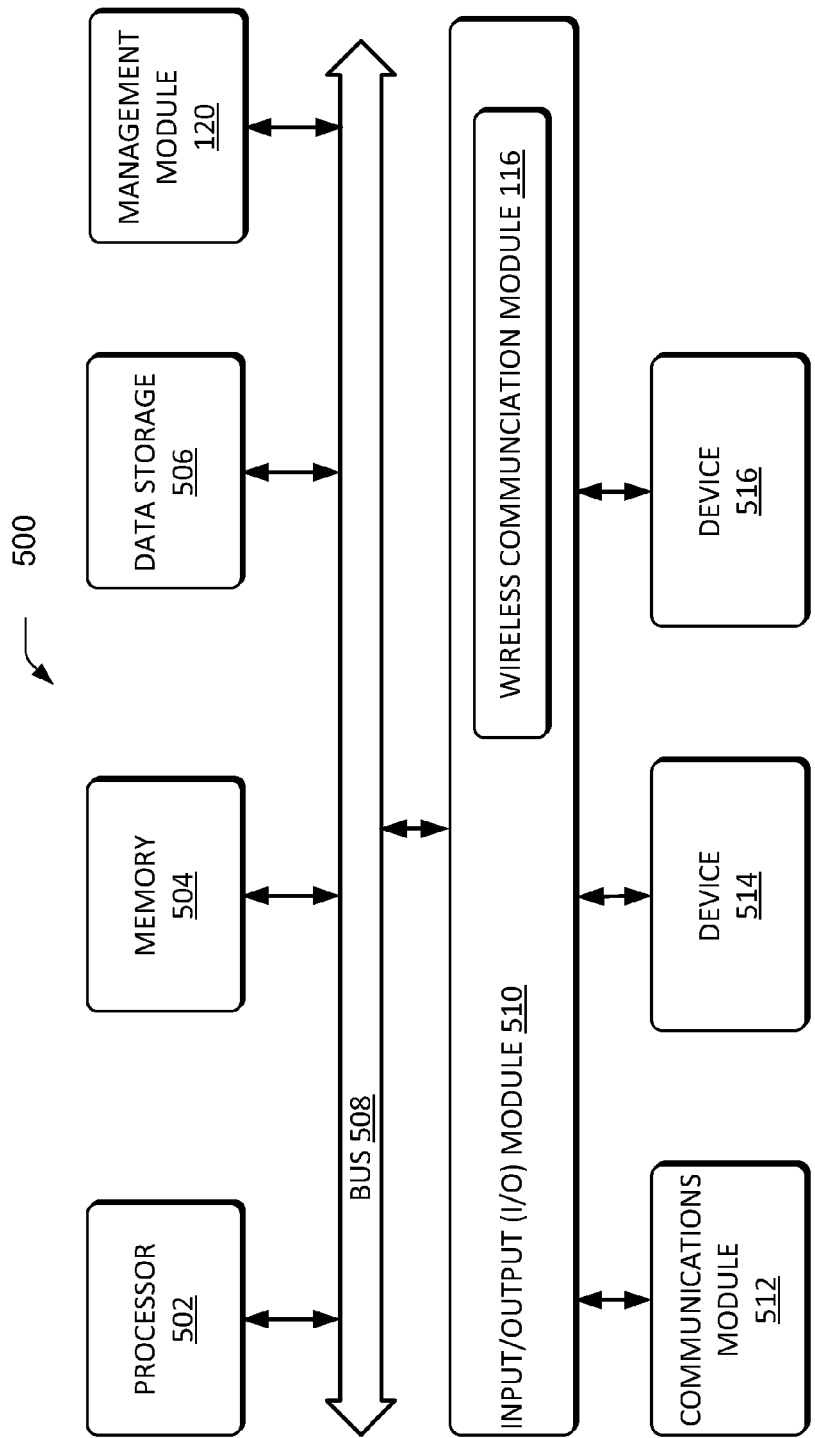
FIG. 5 is a high-level block diagram illustrating an example computer system suitable for implementing the technology described herein.

FIG. 5 is a high-level block diagram illustrating an example computer system 500 suitable for implementing the tap-to-wake and tap-to-login environment 100 of FIG. 1. In certain aspects, the computer system 500 may be implemented using hardware or a combination of software and hardware.

The illustrated computer system 500 includes a processor 502, a memory 504, data storage 506, and the management module 120 coupled to a bus 508 or other communication mechanism for communicating information. An input/output (I/O) module 510 is also coupled to the bus 508. A communications module 512, a device 514, and a device 516 are coupled to the I/O module 510.

The processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The processor 502 may be used for processing information. The processor 502 can be supplemented by, or incorporated in, special purpose logic circuitry.

The memory 504 may be Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device used for storing information, a computer program, and/or instructions to be executed by the processor 502. They memory 504 may store code that creates an execution environment for one or more computer programs used to implement technology described herein.

A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Unless indicated otherwise by the context, a module refers to a component that is hardware, firmware, and/or a combination thereof with software (e.g., a computer program.) A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The instructions may be implemented in one or more computer program products, i.e., one or more modules of computer program instructions encoded on one or more computer readable media for execution by, or to control the operation of, the computer system 500, and according to any method well known to those of skill in the art. The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM))

The data storage 506 may be a magnetic disk or optical disk, for example. The data storage 506 may function to store information and instructions to be used by the processor 502 and other components in the computer system 500.

The bus 508 may be any suitable mechanism that allows information to be exchanged between components coupled to the bus 508. For example, the bus 508 may be transmission media such as coaxial cables, copper wire, and fiber optics, optical signals, and the like.

The I/O module 510 includes the wireless communication module 116. The I/O module 510 can be any input/output module. Example input/output modules 510 include data ports such as Universal Serial Bus (USB) ports.

The communications module 512 may include networking interface cards, such as Ethernet cards and modems.

The device 514 may be an input device. Example devices 514 include a keyboard, a pointing device, a mouse, or a trackball, by which a user can provide input to the computer system 500.

The device 516 may be an output device. Example devices 516 include displays such as cathode ray tubes (CRT) or liquid crystal display (LCD) monitors that display information, such as webpages, for example, to the user.

One or more implementations are described herein with reference to illustrations for particular applications. It should be understood that the implementations are not intended to be limiting. Those skilled in the art with access to the teachings provided herein will recognize additional modifications, applications, and implementations within the scope thereof and additional fields in which the technology would be of significant utility. In the above description of example implementations, for purposes of explanation, specific numbers, materials, configurations, and other details are set forth in order to better explain implementations as claimed. However, it will be apparent to one skilled in the art that the claims may be practiced using details different than the examples described herein. In other instances, well-known features are omitted or simplified to clarify the description of the example implementations.

For example, it will be appreciated that several of the above-disclosed and other features and functions, or alternatives thereof, may be combined into many other different systems or applications. Also, it will be appreciated that various presently unforeseen or unanticipated alternatives, modifications, variations or improvements therein may be subsequently made by those skilled in the art, which are also intended to be encompassed by the claims that follow.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. An apparatus comprising:
    a wireless communication module that is configured to detect a presence of a wireless communication device while the wireless communication module is in a device-detect mode and at a power-gated sleep state;
    an authentication module that is configured to obtain an indication of the detection of the presence of the wireless communication device from the wireless communication module and, in response to the obtained indication, to authenticate the wireless communication device;
    a login module that is configured to obtain a login credential for the wireless communication device and to validate the login credential; and
    a power management module that is configured to cause a power state of a computing device platform to change from the device-detect mode to a first power state in response to the validation of the login credential and the indication of the detection of the presence of the wireless communication device from the wireless communication module, and to change from the first power state to a second power state in response to the indication from the authentication module that the wireless communication device is authenticated, wherein the first power state and the second power state includes a low-power state and a normal operation power state, respectively, of the apparatus.

2. An apparatus according to claim 1 wherein the authentication module is further configured to establish a secure connection to the wireless communication device.

3. An apparatus according to claim 1 wherein the authentication module is further configured to present an authentication challenge to the wireless communication device via the wireless communication module.

4. An apparatus according to claim 1, wherein the login credential is obtained from the apparatus.

5. An apparatus according to claim 1 wherein the power management module is further configured to cause the power state of the computing device to change from the second power state to the first power state in response to an indication from the authentication module that the wireless communication device is no longer present.

6. An apparatus according to claim 1 wherein the power management module is further configured to cause the power state of the computing device to change from the second power state to a third power state different from the second power state in response to an indication from the authentication module that a signal from the wireless communication device is no longer present.

7. An apparatus according to claim 1 wherein the power management module is further configured to cause the power state of the computing device to change from the second power state to a third power state different from the second power state in response to an indication from the authentication module that a signal from the wireless communication device is reduced.

8. An apparatus according to claim 1 wherein the power management module is further configured to cause the power state of the computing device to change from the second power state to the first power state in response to an indication from the authentication module that the wireless communication device is authenticated a second time.

9. An apparatus according to claim 1 wherein the wireless communication module includes at least one of a near field communication (NFC) sensor, a Bluetooth sensor, an infrared sensor, an accelerometer, a palm vein sensor, an ambient light sensor, and an ultrasound sensor.

10. A method performed by a computing device platform comprising:
    detecting a presence of a wireless communication device while the computing device platform is in a device-detect mode and at a power-gated sleep state;
    in response to an indication that the presence of the wireless communication device is detected:
    changing a power state of the computing device platform from the device-detect mode to a first power state;
    authenticating the wireless communication device;
    in response to the authentication, obtaining a login credential for the computing device platform;
    validating the login credential; and
    in response to validating the login credential:
        changing the power state of the computing device platform from the first power state to a second power state, wherein the first power state and the second power state includes a low-power state and a normal operation power state, respectively, of the computing device platform; and
        launching a user's environment on a display of the computing device platform.

11. A method according to claim 10 further comprising:
generating an authentication challenge; and
in response to the authentication challenge, obtaining an authentication challenge response.

12. A method according to claim 10, wherein the login credential is obtained from the computing device platform.

13. A method according to claim 10 further comprising changing the power state of the computing device from the second power state to the first power state in response to an indication that the wireless communication device is no longer present.

14. A method according to claim 10 further comprising causing the power state of the computing device to change from the second power state to a third power state different from the second power state in response to an indication that a signal for the wireless communication device is no longer present.

15. A method according to claim 10 further comprising causing the power state of the computing device to change from the second power state to a third power state different from the second power state in response to an indication from the authentication module that a signal from the wireless communication device is reduced.

16. A method according to claim 10 further comprising causing the power state of the computing device to change from the second power state to the first power state in response to an indication from the authentication module that the authentication status of the wireless communication device is tested a second time.

17. A method according to claim 10 wherein the wireless communication module includes at least one of a near field communication (NFC) sensor, a Bluetooth sensor, an infrared sensor, an accelerometer, a palm vein sensor, an ambient light sensor, and an ultrasound sensor.

18. One or more non-transitory computer-readable media storing processor-executable instructions that when executed cause one or more processors to perform a method comprising:
detecting a presence of a wireless communication device while the computing device platform is in a device-detect mode and at a power-gated sleep state;
in response to an indication that the presence of the wireless communication device is detected:
changing a power state of the computing device platform from the device-detect mode to a first power state;
authenticating the wireless communication device;
in response to the authentication, obtaining a login credential for the computing device platform;
validating the login credential; and
in response to validating the login credential:
changing the power state of the computing device platform from the first power state to a second power state, wherein the first power state and the second power state includes a low-power state and a normal operation power state, respectively, of the computing device platform; and
launching a user's environment on a display of the computing device platform.

19. One or more non-transitory computer-readable media according to claim 18 further comprising:
generating an authentication challenge; and
in response to the authentication challenge, obtaining an authentication challenge response.

20. One or more non-transitory computer-readable media according to claim 18, wherein the login credential is obtained from the computing device platform.

21. One or more non-transitory computer-readable media according to claim 18 further comprising changing the power state of the computing device from the second power state to the first power state in response to an indication that the wireless communication device is no longer present.

22. One or more non-transitory computer-readable media according to claim 18 further comprising causing the power state of the computing device to change from the second power state to a third power state different from the second power state in response to an indication that a signal for the wireless communication device is no longer present.

23. One or more non-transitory computer-readable media according to claim 18 further comprising causing the power state of the computing device to change from the second power state to a third power state different from the second power state in response to an indication from the authentication module that a signal from the wireless communication device is reduced.

24. One or more non-transitory computer-readable media according to claim 18 further comprising causing the power state of the computing device to change from the second power state to the first power state in response to an indication from the authentication module that the wireless communication device does not respond to an authentication challenge.

25. One or more non-transitory computer-readable media according to claim 18 wherein the wireless communication module includes at least one of a near field communication (NFC) sensor, a Bluetooth sensor, an infrared sensor, an accelerometer, a palm vein sensor, an ambient light sensor, and an ultrasound sensor.

26. A system comprising:
a memory that is configured to store data; and
a chipset having:
a wireless communication module that is configured to detect a presence of a wireless communication device while the wireless communication module is in a device-detect mode and at a power-gated sleep state;
an authentication module that is configured to obtain an indication of the detection of the presence of the wireless communication device from the wireless communication module and, in response to the obtained indication, to authenticate the wireless communication device;
a login module that is configured to obtain a user's login credentials from the authentication module and, in response to the authentication of the wireless communication device, launch a user's environment on a display of the system; and
a power management module that is configured to cause a power state of a computing device platform to change from the device-detect mode to a first power state in response to the indication of the detection of the presence of the wireless communication device from the wireless communication module, and to change from the first power state to a second power state in response to the indication from the authentication module that the wireless communication device is authenticated and an indication from the login module that the user is logged in,
wherein the memory is configured to lose stored data in the first power state and to retain stored data in the second power state, wherein the first power state and the second power state includes a low-power state and a normal operation power state, respectively, of the computing device platform.

27. A system according to claim 26 wherein the wireless communication module includes at least one of a near field communication (NFC) sensor, a Bluetooth sensor, an infrared sensor, an accelerometer, a palm vein sensor, an ambient light sensor, and an ultrasound sensor.

28. A system according to claim 26 wherein the power management module is further configured to cause the power state of the computing device to change from the second power state to the first power state in response to an indication from the authentication module that the wireless communication device is authenticated a second time.

\* \* \* \* \*